(12) United States Patent
Abe et al.

(10) Patent No.: US 11,681,437 B2
(45) Date of Patent: Jun. 20, 2023

(54) DYNAMIC TAPE STORAGE DEVICE DATA BUFFER

(71) Applicant: International Business Machines Corporation, Armonk, NY (US)

(72) Inventors: Atsushi Abe, Ebina (JP); Tsuyoshi Miyamura, Yokohama (JP); Hiroshi Itagaki, Yokohama (JP); Tohru Hasegawa, Tokyo (JP); Noriko Yamamoto, Tokyo (JP); Shinsuke Mitsuma, Machida (JP); Sosuke Matsui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 17/185,089

(22) Filed: Feb. 25, 2021

(65) Prior Publication Data
US 2022/0269408 A1    Aug. 25, 2022

(51) Int. Cl.
*G06F 3/06* (2006.01)
*G11B 5/008* (2006.01)

(52) U.S. Cl.
CPC .......... *G06F 3/0604* (2013.01); *G06F 3/0631* (2013.01); *G06F 3/0656* (2013.01); *G06F 3/0682* (2013.01); *G11B 5/00817* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825;
(Continued)

(56) References Cited

U.S. PATENT DOCUMENTS 4,757,396 A * 7/1988 Ishiguro ................. G11B 27/13
4,788,641 A * 11/1988 Ishiguro ................. G06F 3/0601
                                                          711/113
(Continued)

FOREIGN PATENT DOCUMENTS

CN    103197895 A    7/2013
CN    103886006 A    6/2014
WO    2022180462 A1  9/2022

OTHER PUBLICATIONS

IBM Spectrum Archive Single Drive Edition and Library Edition Installation and Configuration Guide; Coyne et al.; Mar. 2018; retrieved from https://www.redbooks.ibm.com/redbooks/pdfs/sg248090.pdf on Jul. 6, 2022 (Year: 2018).*
(Continued)

*Primary Examiner* — Daniel C. Chappell
(74) *Attorney, Agent, or Firm* — Aaron Pontikos

(57) ABSTRACT

A computer-implemented method for altering a position on a tape at which the tape transitions to a DATA_FULL state is disclosed. The computer-implemented method further includes determining, after a file is written to a Data Partition of the tape, a size of an Index representing metadata associated with the file. The computer-implemented method further includes altering, based on the size of the Index representing metadata associated with the file, a position in the Data Partition of the tape at which the tape transitions to the DATA_FULL state.

17 Claims, 8 Drawing Sheets

(58) Field of Classification Search
CPC ....... G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 4,835,630 A * | 5/1989 | Freer | G11B 27/28 |
| 5,452,150 A * | 9/1995 | Henneberger | G11B 15/087 |
| 6,271,979 B1 * | 8/2001 | Yoshida | G11B 27/328 |
| 7,200,546 B1 * | 4/2007 | Nourmohamadian | G06F 3/0686 710/33 |
| 8,630,058 B2 * | 1/2014 | Sato | G11B 15/60 360/78.12 |
| 10,168,962 B2 * | 1/2019 | Matze | G06F 3/0605 |
| 10,453,485 B1 * | 10/2019 | Miyamura | G11B 20/1201 |
| 10,564,902 B2 * | 2/2020 | Abe | G11B 27/329 |
| 2002/0124967 A1 * | 9/2002 | Sharp | B65H 35/0013 156/496 |
| 2004/0156267 A1 * | 8/2004 | O'Brien | G01V 1/16 367/149 |
| 2005/0016671 A1 * | 1/2005 | Sharp | B65H 35/0013 156/577 |
| 2008/0250198 A1 * | 10/2008 | Purchase | G06F 3/06 |
| 2010/0265612 A1 * | 10/2010 | Jaquette | G11B 5/00817 29/603.01 |
| 2013/0179607 A1 | 7/2013 | Brume | |
| 2014/0181425 A1 * | 6/2014 | Ashida | G06F 16/1774 711/153 |
| 2016/0041758 A1 * | 2/2016 | Iwasaki | G06F 3/0665 711/103 |
| 2017/0220651 A1 | 8/2017 | Mathew | |
| 2020/0042607 A1 * | 2/2020 | Mitsuma | G06F 16/119 |

OTHER PUBLICATIONS

Mell et al., "The NIST Definition of Cloud Computing", Recommendations of the National Institute of Standards and Technology, NIST Special Publication 800-145, Sep. 2011, 7 pages.

International Search Report and Written Opinion, International Application No. PCT/IB2022/050811, dated Jan. 31, 2022.

* cited by examiner

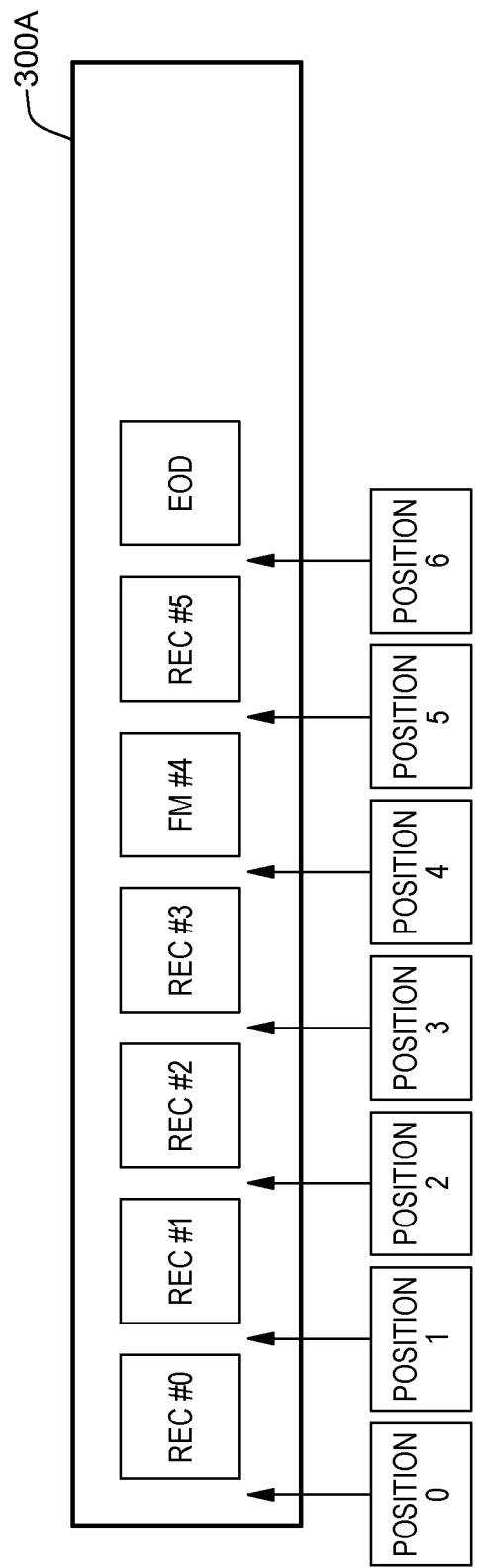
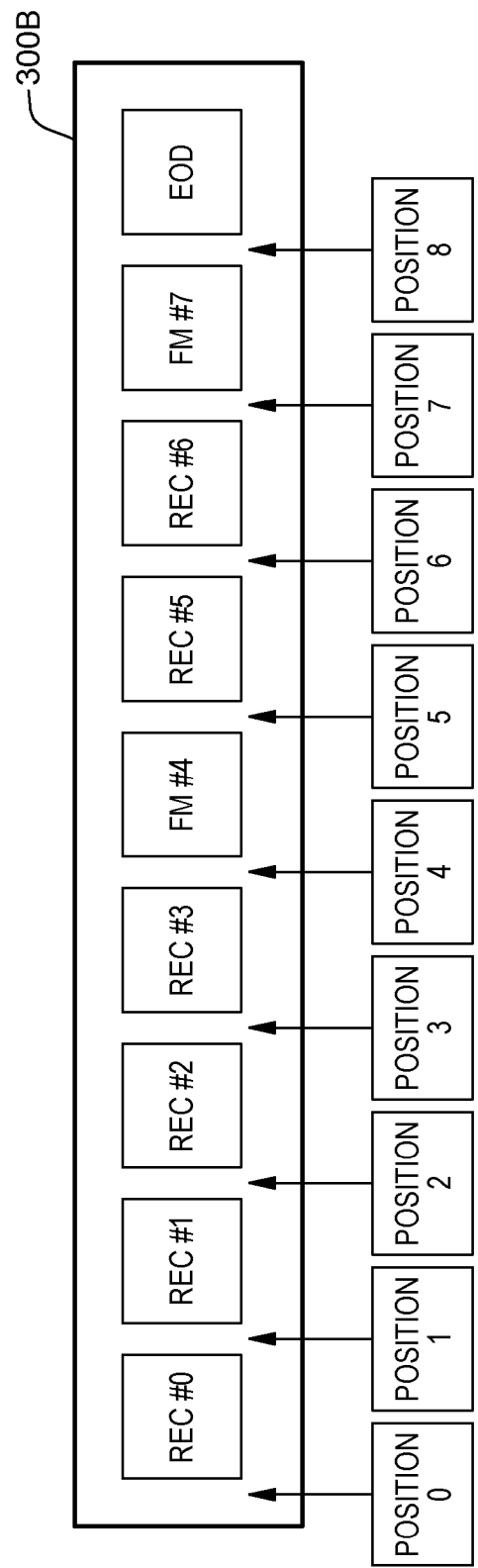
FIG. 3A
FIG. 3B

DYNAMIC TAPE STORAGE DEVICE DATA BUFFER

BACKGROUND

The present invention relates generally to the field of tape storage systems, and more particularly to magnetic tape storage systems having partitions.

A tape drive is a data storage device that reads and writes data on magnetic tape. Current versions of magnetic tape data storage allow a tape to be divided into separately writable areas, known as partitions. For example, magnetic tape may be divided into an Index Partition and one or more Data Partitions. With the advent of tape partitions, a tape format and file system, known as the Linear Tape File System (LTFS), made it possible to utilize tape in a similar manner to other external storage devices, such as a USB flash drive or external hard disk drive. Accordingly, under the LTFS, file data and filesystem metadata is stored in separate partitions on the tape, wherein an index presents the file data as if organized into directories.

SUMMARY

According to one embodiment of the present invention, a computer-implemented method for altering a position on a tape at which the tape transitions to a DATA_FULL state is disclosed. The computer-implemented method includes determining, after a file is written to a Data Partition of the tape, a size of an Index representing metadata associated with the file. The computer-implemented method further includes altering, based on the size of the Index representing metadata associated with the file, a position in the Data Partition of the tape at which the tape transitions to the DATA_FULL state.

According to another embodiment of the present invention, a computer program product for altering a position on a tape at which the tape transitions to a DATA_FULL state is disclosed. The computer program product includes one or more computer readable storage media and program instructions stored on the one or more computer readable storage media. The program instructions include instructions to determine, after a file is written to a Data Partition of the tape, a size of an Index representing metadata associated with the file. The program instructions further include instructions to alter, based on the size of the Index representing metadata associated with the file, a position in the Data Partition of the tape at which the tape transitions to the DATA_FULL state.

According to another embodiment of the present invention, a computer system altering a position on a tape at which the tape transitions to a DATA_FULL state is disclosed. The computer system includes one or more computer system includes one or more computer processors, one or more computer readable storage media, and program instructions stored on the computer readable storage media for execution by at least one of the one or more processors. The program instructions include instructions to determine, after a file is written to a Data Partition of the tape, a size of an Index representing metadata associated with the file. The program instructions further include instructions to alter, based on the size of the Index representing metadata associated with the file, a position in the Data Partition of the tape at which the tape transitions to the DATA_FULL state.

BRIEF DESCRIPTION OF THE DRAWINGS

FIG. 3A is a block diagram illustrating an example of file data stored on a Data Partition 300A of a tape in accordance with at least one embodiment of the present invention.

FIG. 3B is a block diagram illustrating an example of file data stored in a Data Partition 300B of a tape after appending file data to data partition 300A of FIG. 3A in accordance with at least one embodiment of the present invention.

DETAILED DESCRIPTION

Figure 1:
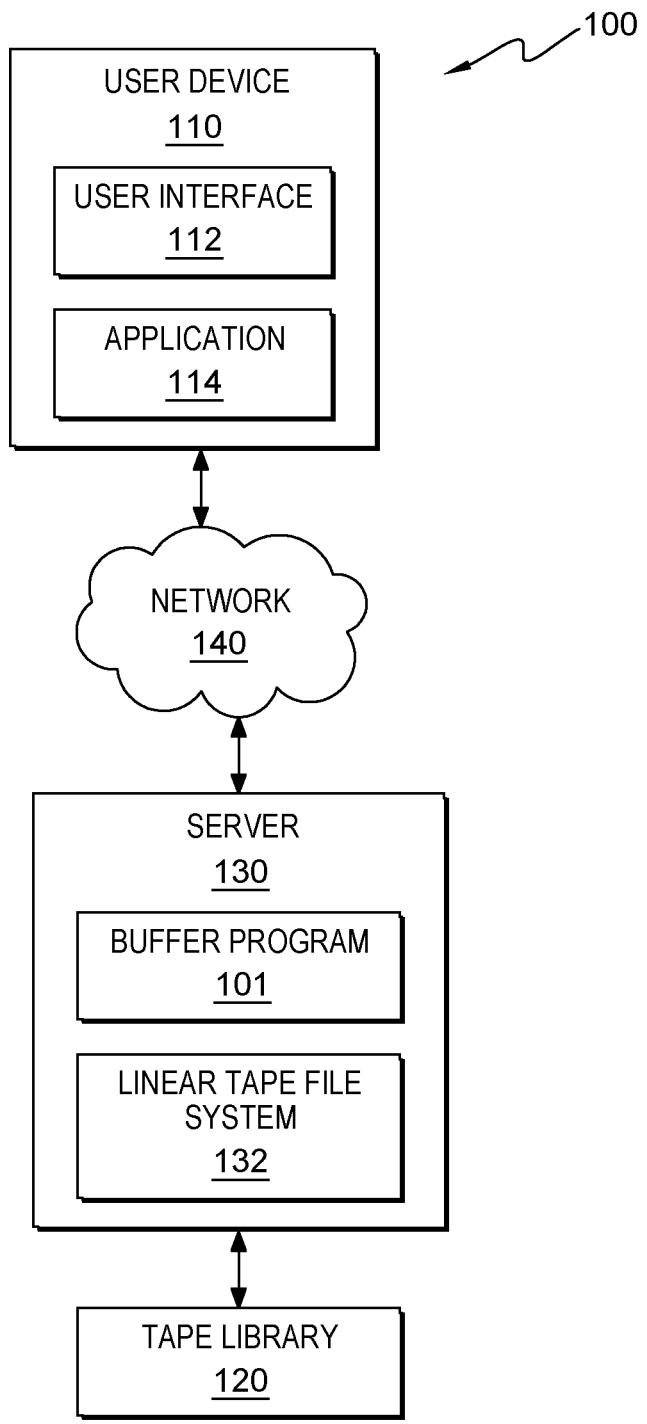
FIG. 1 is a functional block diagram of a network computing environment, generally designated 100, suitable for operation of a buffer program 101 in accordance with at least one embodiment of the invention.

The present invention relates generally to the field of tape storage systems, and more particularly to magnetic tape storage systems having partitions.

Linear tape open (LTO) is a magnetic tape data storage technology. LTO storage technology may generally be referred to as an open-format tape storage technology having a single reel of magnetic tape stored in a removable tape cartridge. LTO storage technology provides for additional optional formatting including, but not limited to, compression, Write Once Read Many (WORM), encryption, and Linear Tape File System (LTFS). Typically, the most recent generations of LTO tape cartridges can be formatted to include up to four Data Partitions. However, the number of possible Data Partitions is dependent on the particular generation of the LTO tape cartridge.

The tape media housed within an LTO formatted tape cartridge is typically divided into four Data Bands extending horizontally throughout the length of the tape. Each of the four Data Bands is separated by a narrow servo band on either side (for a total of 5 narrow Servo Bands). Servo Bands provide location information to the tape head as it reads and writes data within a specific Data Band. Tape heads generally span the width of one Data Band and the adjacent (i.e., top and bottom) Servo Bands, and move in a vertical direction across the width of the horizontally oriented tape. Tape head position is controlled by the system of Servo Bands and the information encoded in each Servo Band during manufacturing. While the tape head moves vertically across the width of the tape, the tape can be moved horizontally along its length (i.e., by winding and unwinding the tape on reels) allowing the tape head to interact with different portions of the tape.

The tape head assembly, that reads from and writes to the tape, straddles a single Data Band and the two adjacent Servo Bands. The tape head assembly can have a set of 8, 16, or 32 data read/write head elements (based on the corresponding set of tracks in a single Data Band) and two (2) servo read elements. All of the tracks in a given set are read or written in a single, one-way, end-to-end pass (i.e., wrap). After making a pass over the whole length of the tape, all tape heads shift slightly in a lateral direction to access a different wrap within the band (or wraps within other bands), making another pass in the reverse direction. Wraps continue in forward and reverse passes. This procedure, known as linear serpentine recording, is repeated until all of the tracks in the bands have been written. The position at which writing all the areas of the tape have been finished is identified as the logical end of the tape.

A linear tape file system (LTFS) allows for an LTO tape cartridge to further be partitioned into an Index Partition (IP) and a Data Partition (DP). File data is generally only written to the Data Partition and metadata (i.e., data describing the file data stored in the Data Partition) is written to the Index Partition. Organizing or partitioning the tape in such a way enables the tape to be self-describing through the use of a file index in the Index Partition. This results in reducing the complexity of data management and data access time for tape storage. Accordingly, a LTFS has made it possible to use magnetic tape storage devices in a similar manner to other removable storage systems (e.g., USB flash drives or external hard disk drives).

Embodiments of the present invention recognize that upon the tape head reaching the end of the tape while appending file data to the Data Partition, the tape cartridge returns an error message and prevents any data from further being appended to the tape. If this scenario arises, it becomes impossible to append an index to the end of the file data written to the Data Partition, thereby ultimately violating LTFS format requirements.

Embodiments of the present invention recognize that one possible solution to the aforementioned problem is to designate a storage area at the end of the tape as a buffer. Upon reaching the buffer during a file operation, the transitions to a DATA_FULL state, in which only metadata write operations (e.g., modifying a timestamp, deleting a file, renaming a file, and writing an index) are permitted in the buffer. It should be noted that once the tape head reaches the buffer, normal data writing operations, such as appending file data to the data partition are no longer permitted.

Embodiments of the present invention further recognize that the size of an Index representing metadata associated with the file data written to the Data Partition depends on the number of records in the file and the size of any extended attributes of the file. Thus, if the size of the Index exceeds the size of the buffer, the entire Index will not be able to be appended to the buffer during after transitioning to a FULL_DATA state, thereby ultimately still violating LTFS format requirements.

Embodiments of the present invention further recognize that a user application often designates the last wrap of the Data Partition as the buffer. However, the size of a single wrap on the tape is dependent on the length of the tape itself. For example, the tape length in an LTO-5 tape cartridge is only 846 meters while the tape length in an LTO-9 tape cartridge is 1,035 meters. If we assume that the Data Partition length of an LTO-5 tape cartridge is 811 meters and the Data Partition length of an LTO-5 tape cartridge is 1,000 meters, then the last wrap on the tape in the LTO-9 tape cartridge would be 189 meters longer than the last data wrap on the tape in the LTO-5 tape cartridge. Accordingly, depending on the size of the Index appended to the buffer at the end of the tape and the size of the buffer itself, a large area of the buffer may be left unused. This stems from the fact that normal data writing operations, such as appending file data to the Data Partition are no longer permitted in the buffer.

Embodiments of the present invention improve upon the foregoing deficiencies by dynamically altering a position on a tape at which the tape transitions to a DATA_FULL state. In an embodiment, the position on the tape at which the tape transitions to a DATA_FULL state is moved based on the size of an Index representing the most recent file data written to the Data Partition. In an embodiment, a storage area is reserved as a buffer for performing metadata write operations only after the tape transitions to a DATA_FULL state. In an embodiment, the buffer is located subsequent to the position on the tape at which the tape transitions to a DATA_FULL state. Accordingly, moving the point on the tape at which the tape transitions to a DATA_FULL state further includes altering the size of the buffer.

For example, a buffer having a size of 500 MB is reserved at the writeable area of the Data Partition of a tape. If the most recent Index appended to the Data Partition contains 200 MB of data, then the size of the buffer is decreased to the last 200 MB of storage in the writeable area of the Data Partition on the tape. Accordingly, embodiments of the present invention advantageously maximize the amount of file data that can be appended to the tape prior to the tape transitioning to a DATA_FULL state, thereby ultimately limiting the amount of unused storage space in the Data Partition of the tape.

Normally, after a transition to a DATA_FULL state, normal file operations are prohibited. Thus, if additional storage space remains in the buffer after metadata writing operations (e.g., appending an Index) are performed, any remaining storage space remains unusable for performing normal file operations. However, by dynamically altering the position on the tape at which the tape transitions to a DATA_FULL state, embodiments of the present invention maximize the amount of data written to the tape while still ensuring enough buffer space remains at the end of the tape to perform any necessary metadata write operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" and "dynamically" mean without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being.

The terms first, second, etc. may be used herein to describe various elements. These elements should not be limited by these terms, as these terms are only used to distinguish one element from another unless stated otherwise or the context clearly indicates otherwise.

As defined herein, "programmable early warning zone (PEWZ)" is a tape parameter set by a tape drive that consists of a 2-byte numerical value that specifies how many MB before an early warning (EW) indicator is generated. When the PEWZ is reached by a tape head during a write operation, a programmable early warning (PEW) is generated that specifies a number of bytes on the tape before the standard end-of-medium EW indicator is reached.

As defined herein, "early warning (EW)" is a warning that is generated when the end of the PEWZ is reached by a tape head during a write operation. The EW indicates that a "DATA_FULL state" has been reached.

As defined herein, "DATA_FULL state" is a state of the tape at which normal file operations are no longer permitted, and only appending metadata operations are permitted.

As used here, the term "buffer" shall mean a storage area of a tape partition that begins subsequent to the end of the PEWZ and ends at the end of the writable area of a partition. Only metadata write operations are permitted in the buffer.

Referring now to various embodiments of the invention in more detail, FIG. 1 is a functional block diagram of a network computing environment, generally designated 100, suitable for operation of a tape buffer program 101 in accordance with at least one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Network computing environment 100 includes user device 110, tape library 120, and server 130 interconnected over network 140. In embodiments of the invention, network 140 can be a telecommunications network, a local area network (LAN), a wide area network (WAN), such as the Internet, or a combination of the three, and can include wired, wireless, or fiber optic connections. Network 140 may include one or more wired and/or wireless networks that are capable of receiving and transmitting data, voice, and/or video signals, including multimedia signals that include voice, data, and video information. In general, network 140 may be any combination of connections and protocols that will support communications between user device 110, tape library 120, server 130, and other computing devices (not shown) within network computing environment 100.

User device 110 allows a user to access an application running on a host device to communicate with buffer program 101, and communicate with tape library 120 in order to write data to and retrieve data from various magnetic tape media via a network, such as network 140. In various embodiments of the present invention, user device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, user device 110 represents any programmable electronic device or combination of programmable electronic devices capable of executing machine readable program instructions and communicating with tape library 120, server 130, and other computing devices (not shown) within network computing environment 100 via a network, such as network 140.

User device 110 includes user interface 112. User interface 112 provides an interface between user device 110, tape library 120, server 130. In some embodiments, user interface 112 can be a graphical user interface (GUI) or a web user interface (WUI) and can display text, documents, web browser windows, user options, application interfaces and instructions for operation, and includes the information (such as graphic, text, and sound) that a program presents to a user and the control sequences the user employs to control the program. In other embodiments, user interface 112 can be a script, application programming interface (API), or mobile application software that provides an interface between user device 110, tape library 120, and server 130.

User device 110 further includes application 114. Application 114 can be representative of one or more applications (e.g., an application suite) that operate on user device 110. In various example embodiments, application 114 can be an application that a user of user device 110 utilizes to send and receive data, such as a mobile device application. In an embodiment, application 114 can be a client-side application associated with an application running on server 130 (e.g., a client-side application associated with buffer program 101). In an embodiment, application 114 can operate to perform processing steps of buffer program 101 (i.e., application 114 can be representative of buffer program 101 operating on user device 110).

Tape library 120 is an automated tape storage device that includes a plurality of tape drives for writing to and reading from tape media, such as single-reel or two-reel magnetic tape cartridges. In an embodiment, tape library includes tape cartridges formatted in accordance with LTO and LTFS format specifications. In an embodiment, tape library 120 is an IBM TS3400™ Tape Library or an IBM TS3500™ Tape Library. While reference is made to IBM-specific hardware and/or software components, it should be understood that aspects of the present invention may be applied equally to other tape library technologies. In embodiments of the invention, tape library 120 includes a plurality of tape media stored in banks or groups of storage slots. For example, tape media may include, but is not limited to magnetic tape cartridges, magnetic tape cassettes, and optical tape cartridges. Tape library 120 further includes a plurality of slots to hold tape cartridges, a barcode reader to identify tape cartridges and an automated method (e.g., a robot) for loading tapes.

In various embodiments of the present invention, server 130 is a computing device that can be a standalone device, a management server, a web server, an application server, a mobile device, or any other electronic device or computing system capable of receiving, sending, and processing data. In an embodiment, server 130 represents a server computing system utilizing multiple computers as a server system, such as in a cloud computing environment. In an embodiment, server 130 represents a computing system utilizing clustered computers and components (e.g. database server computer, application server computer, web server computer, webmail server computer, media server computer, etc.) that act as a single pool of seamless resources when accessed within network computing environment 100. In general, server 130 represents any programmable electronic device or combination of programmable electronic devices capable of executing machine readable program instructions and communicating with each other, as well as with user device 110 and tape library 120 within network computing environment 100 via a network, such as network 140.

Server 130 includes linear tape file system (LTFS) 132. Although LTFS 132 is depicted in FIG. 1 as being integrated with server 130, in alternative embodiments, LTFS 132 is remotely located from server 130. For example, LTFS 132 may be located on user device 110 or on a device located within tape library 120.

LTFS 132 is a file system that allows files stored on tape cartridges in a tape library to be accessed in a similar fashion as files stored on a hard disk or flash drive. It requires both a specific format of data on the tape media and software to provide a file system interface to the data. Each LTFS formatted tape cartridge in tape library 120 appears as a separate folder under the filesystem mount point. One of ordinary skill in the art will appreciate that applying a file system to a tape drive allows users to organize and search the contents of tape media as they would on hard disk, improving access time for data stored on tape media. For example, LTFS 132 is an IBM Linear Tape File System—Library Edition (LTFS-LE) that allows LTFS volumes (i.e., tape media) to be used with a tape library, such as tape library 120. While reference is made to IBM-specific hardware and/or software components, it should be understood that aspects of the present invention may be applied equally to other tape library technologies.

Server 130 further includes buffer program 101. In an embodiment, migration program 101 operates on a central server, such as server 130, and can be utilized by one or more user devices, such as user device 110, via an application download from the central server or a third-party application store, and executed on client device 110. In an embodiment, buffer program 101 may be software, downloaded from a central server, such as server 130, and installed on one or more user devices, such as user device 110. In an embodiment, buffer program 101 may be utilized as a software service provided by a third-party cloud service provider (not shown). In an embodiment, buffer program 101 may include one or more components, such as add-ons, plug-ins, and agent programs, etc. (not shown), installed on one or more user devices, such as user device 110.

In various embodiments of the present invention, buffer program 101 dynamically alters the position on the tape at which the tape transitions to a DATA_FULL state. In an embodiment, the position on the tape at which the tape transitions to a DATA_FULL is repositioned based on the size of an Index to be appended to the Data Partition. In an embodiment, the position on the tape at which the tape transitions to a DATA_FULL is repositioned based on the size of the last Index appended to the Data Partition. In an embodiment, the position on the tape at which the tape transitions to a DATA_FULL is repositioned based on an average size of a predetermined number of previous Indexes appended to Data Partition. In an embodiment, the position on the tape at which the tape transitions to a DATA_FULL is repositioned based on an average of all of the previous Indexes appended to the Data Partition.

In an embodiment, altering the position on the tape at which the tape transitions to a DATA_FULL state further includes modifying the size of a buffer reserved for appending metadata write operations only after the tape transitions to a DATA_FULL state.

In an embodiment, altering the position on the tape at which the tape transitions to a DATA_FULL state further includes altering a location of a programmable early warning zone (PEWZ) on the tape. Upon a tape head reaching the PEWZ during a write operation, a programmable early warning (PEW) is issued that warns a user application that the tape is running out of space to perform normal file operations. In an embodiment, if a PEW is detected while the tape head is performing a write operation, buffer program 101 transitions the tape drive to a DATA_FULL state. In an embodiment, if a PEW is detected while the tape head is performing a write operation, the normal file operations are permitted until the tape head reaches the end of the PEWZ. At this point, buffer program 101 transitions the tape to a DATA_FULL state.

Figure 2:
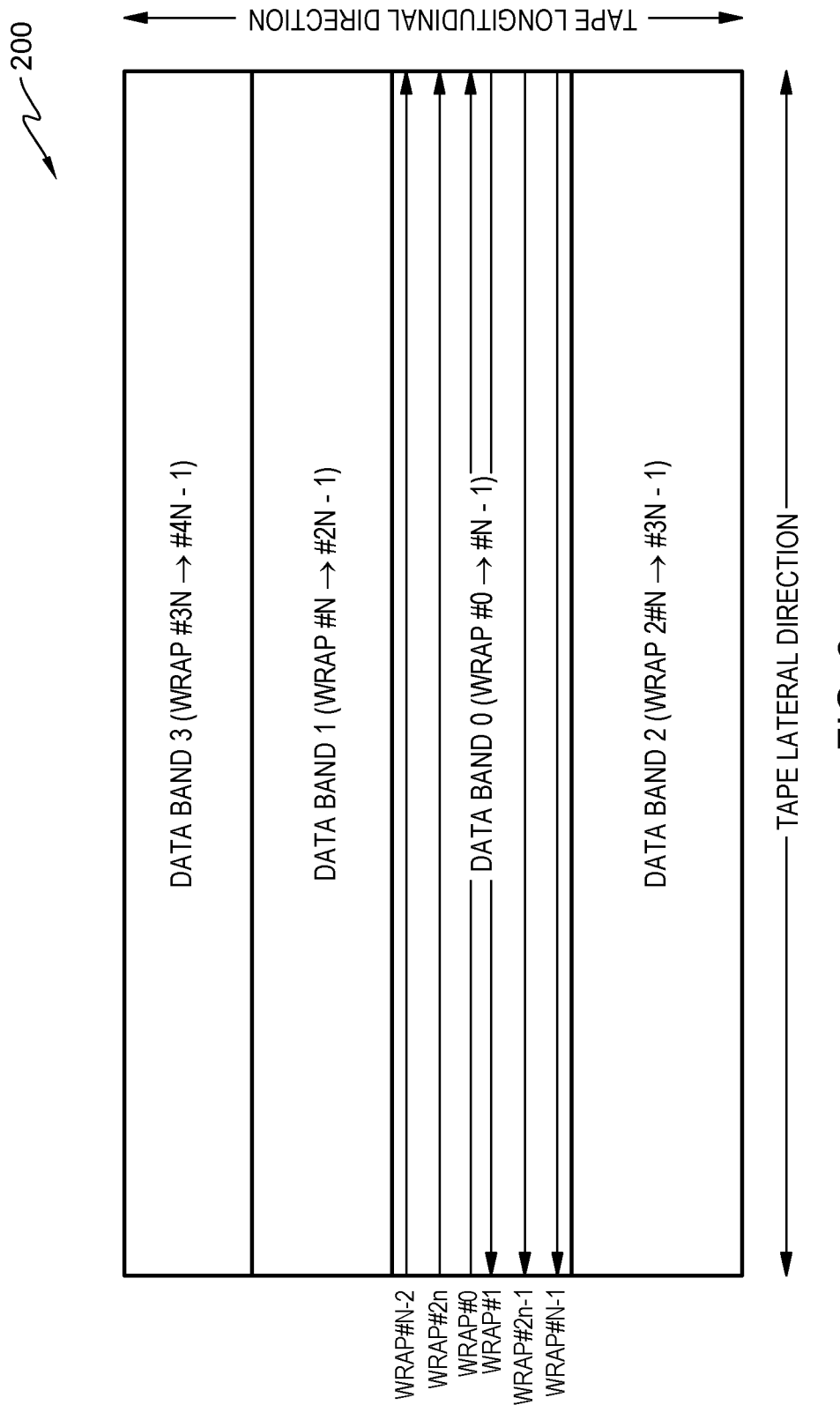
FIG. 2 is an exemplary linear serpentine recording on a tape, generally designated 200, in accordance with at least one embodiment of the present invention.

FIG. 2, an exemplary linear serpentine recording on a tape, generally designated 200, in accordance with at least one embodiment of the present invention can be seen. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Whereas the lateral direction of the tape is divided into a plurality of wraps, data is written and/or read along the longitudinal direction of the tape for each wrap. Numbers are assigned to each wrap in the order of writing. Typically, wraps are arranged on the tape such that wraps running in the same direction are adjacent to each other. For example, wraps running in a forward direction (i.e., wraps running from the beginning of the tape to the end of the tape) are adjacent to each other. Similarly, wraps running in a reverse direction (i.e., wraps running from the end of the tape to the beginning of the tape) are adjacent to each other. The number of wraps and the number of tracks within each wrap is dependent on the generation of the LTO cartridge. The width in the lateral direction of the wraps (i.e., track pitch) is dependent on the tape width and the number of wraps on the tape. For example, a LTO-2 tape cartridge has 4 Data Bands and 16 wraps per band, thus requiring 64 passes to fill. On the other hand, a LTO-7 tape cartridge has 4 Data Bands and 28 wraps per band, thus requiring 112 passes to fill.

As depicted in FIG. 2, tape 200 is divided into four Data Bands (Data Band 0, Data Band 1, Data Band 2, and Data Band 3). As further depicted in FIG. 2, data recorded in wraps running in the forward direction—Wrap 0, Wrap 2N, and Wrap N−2 in Data Band 0 can be seen. These forward running wraps are arranged on the tape such that even numbered wraps within a data band are adjacent to each other. Similarly, data recorded in wraps running in the reverse direction—Wrap 1, Wrap 2N−1, and Wrap N−1 in Data Band 0 can be seen. These reverse running wraps are arranged on the tape such that odd numbered wraps within a data band are adjacent to each other. As data is written to each subsequent wrap in a common recording direction, irrespective of the particular direction of recording, the next subsequent wrap is positioned outward from the middle of the Data Band towards the perimeter of the Data Band.

FIG. 3A is a block diagram illustrating an example of file data stored in a Data Partition 300A of a tape, in accordance with at least one embodiment of the invention. FIG. 3A provides an illustration of only one implementation and does not imply any limitations with regard to the environments in which different embodiments may be implemented. Many modifications to the depicted environment may be made by those skilled in the art without departing from the scope of the present invention as recited by the claims.

One of ordinary skill in the art will appreciate that although data stored in a LTFS appears to behave like data stored on a hard disk, the fundamental sequential nature of writing data to tape media remains. Data is sequentially written to zones (i.e., logical blocks) of a predetermined, fixed size and files are always appended to the end of the tape. Furthermore, a LTFS is a write-once file system. In other words, if a file stored on one or more data blocks is modified, overwritten, or removed from a tape image, the associated data blocks are not freed up. Rather, the memory allocated to the associated data blocks becomes invalid (i.e., the associated data blocks are no longer referenced in an index) and newly added data is written as separate, non-contiguous blocks after the end of data (EOD) mark on the tape.

Furthermore, one of ordinary skill in the art will appreciate that unlike a read/write command for a block device, such as a hard disk, a read/write command issued to a tape drive does not specify a block number. However, the position of data corresponding to a read/write request can be determined based on the current position of the tape media with respect to the tape head. The current position of the tape media can be retrieved by issuing a "Read Position" command. Similarly, the current position of the tape media can be set to any position by issuing a "Locate/Space" command. When a read/write command is successfully executed, the current position of the tape media is updated.

In embodiments of the present invention, data written to magnetic tape includes the following information: (i) record, (ii) file mark ("FM"), and (iii) end of data ("EOD") mark. The term "record" as used herein shall refer to a variable length data sequence on the tape. The term "file mark (FM)" as used herein shall refer to a zero-length separator on the tape that delimits data (i.e., records) of a particular file. The term "end of data mark (EOD)" as used herein shall refer to a designation of the end of the data written to the tape.

As depicted by FIG. 3A, Data Partition 300A includes Position_0, Position_1, Position_2, Position_3, Position_4, Position_5, and Position_6. Positions 0-6 demarcate physical units of data (i.e., data blocks) of Data Partition 300A. In embodiments of the present invention, blocks can include a single record, part of a record, or multiple records. In some embodiments, data blocks can be fixed in size. In other embodiments, data blocks can be variable in size. Data partition 300A further includes the following records: Rec #0, Rec #1, Rec #2, Rec #3, FM #4, and Rec #5. Rec #0, Rec #1, Rec #2, and Rec #3 belong to the same file and Rec #5 belongs to a different file as indicated by FM #4 located between Rec #3 and Rec #5. Rec #5 is the end of the data (as indicated by end of data (EOD) mark) at Position_6. In embodiments of the invention, when a "READ" command is issued, the current position of the tape head is updated. For example, if the current position of a tape head is at Position_1 and a "READ" command is issued for Rec #3, the tape head is moved to Position_3 and Rec #3 is read. Upon completion of reading Rec #3, the current position of the tape head is updated to Position_4.

FIG. 3B is a block diagram illustrating an example of file data stored in a Data Partition 300B of a tape after appending file data to Data Partition 300A of FIG. 3A in accordance with at least one embodiment of the present invention. FIG. 3B provides an illustration of only one implementation and does not imply any limitations with regard to the environments in which different embodiments may be implemented. Many modifications to the depicted environment may be made by those skilled in the art without departing from the scope of the invention as recited by the claims.

Data partition 300B in FIG. 3B illustrates Data Partition 300A of FIG. 3A after a "WRITE" command was issued. In an embodiment, a "WRITE" command can include, but is not limited to, one or more of the following: (i) modifying a record, (ii) overwriting a record, and (iii) adding new data. Data Partition 300B includes Position_0, Position_1, Position_2, Position_3, Position_4, Position_5, Position_6, and Position_7. Positions 0-6 of Data Partition 300B of FIG. 3B correspond to Positions 0-6 of Data Partition 300A of FIG. 3A. Data Partition 300B of FIG. 3B further includes the following records: Rec #0, Rec #1, Rec #2, Rec #3, FM #4, Rec #5, and Rec #6. Recs #0-#5 of Data Partition 300B of FIG. 3B correspond to Recs #0-#5 of Data Partition 300A of FIG. 3A. In an embodiment, "WRITE" operations append data to the EOD mark. As depicted by Data Partition 300B, a "WRITE" command was issued. Accordingly, since Rec #5 was the last record written to Data partition 300A at Position_5 (signified by the EOD mark at Position_6) in FIG. 3A, Rec #6 was written to Position 6, FM #7 was written to Position 7, and the EOD mark was updated to Position_8 in Data Partition 300B of FIG. 3B.

Figure 4A:
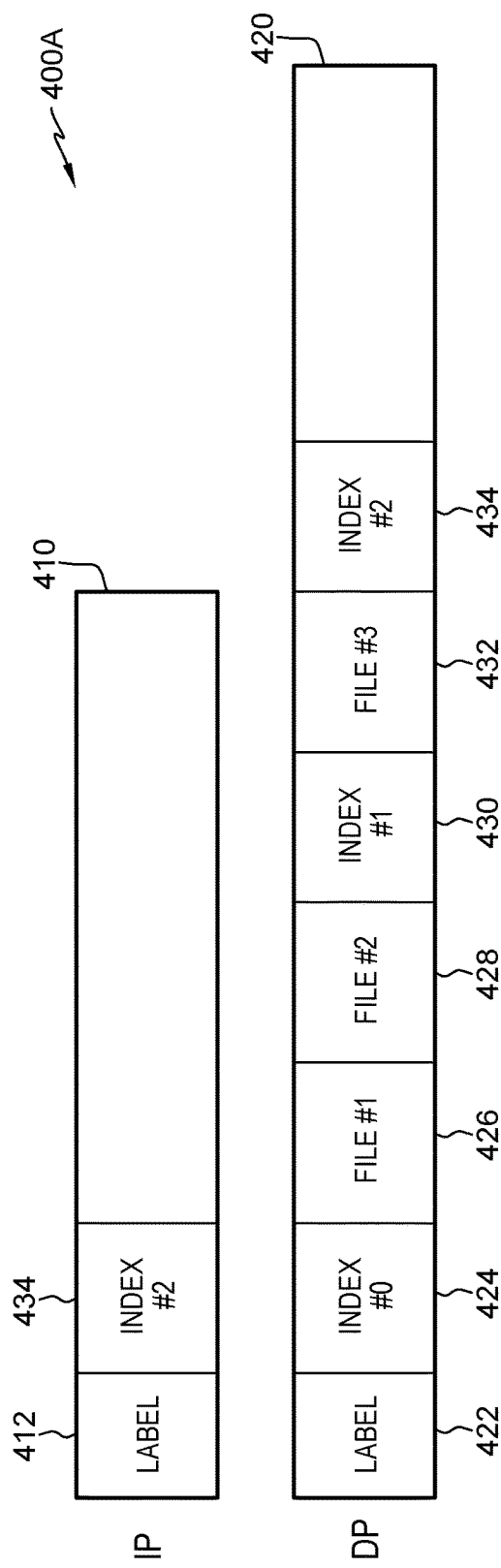
FIG. 4A is a block diagram illustrating an example of a LTFS volume, generally designated 400A, in accordance with at least one embodiment of the present invention.

FIG. 4A is a block diagram illustrating an example of a LTFS volume, generally designated 400A, in accordance with at least one embodiment of the present invention. FIG. 4A provides an illustration of only one implementation and does not imply any limitations with regard to the environments in which different embodiments may be implemented. Many modifications to the depicted environment may be made by those skilled in the art without departing from the scope of the invention as recited by the claims.

In various embodiments of the present invention, a LTFS volume includes a pair of LTFS partitions—a Data partition and an Index partition. After file data is appended to the Data Partition, an index construct (containing metadata associated with the file data in the Data Partition) is appended to the end of the file data and the Index of the Index Partition is overwritten with the index construct appended to the Data Partition.

Each partition includes a label construct followed by a content area. The label construct contains identifying information for a particular LTFS volume. In a Data Partition, the content area is formed from data extents and index constructs. A data extent contains file data written as sequential logical blocks. A file shall consist of zero or more data extents plus associated metadata stored in an index construct. An index construct contains an Index, which is an XML data structure that describes the mapping between files and data extents.

In an Index Partition, the content area is formed from three different types of information—a generation number, self pointers, and back pointers. A generation number includes the age of the most recent Index relative to past Indexes in a volume. Each Index in a volume has a generation number, which is a non-negative integer that increases as changes are made to the volume. The Index with the highest number on the volume represents the current state of the entire volume. A self pointer records the volume to which the Index belongs to and the block position of the Index within that volume. A back pointer records the block position of the last Index present in the Data partition immediately before this Index was written.

As depicted by FIG. 4A, Data Partition (DP) 420 includes label construct 422 and the content area includes Index #0, File #1, File #2, Index #1, File #3, and Index #2. Index Partition (IP) 410 includes label construct 412, and Index #2. Index #2 in DP 420 is the same Index as Index #2 in IP 410.

Figure 4B:
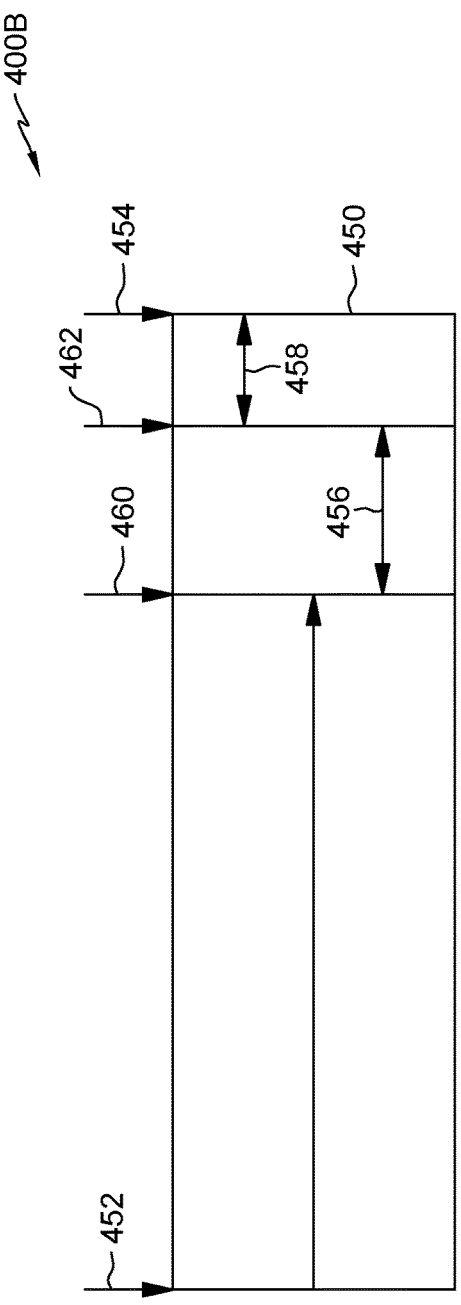
FIG. 4B is a block diagram illustrating an example of a programmable early warning zone (PEWZ) on a tape, generally designated 400B, in accordance with at least one embodiment of the present invention.

FIG. 4B is a block diagram, generally designated 400B, illustrating an example of a programmable early warning zone (PEWZ) on a tape in accordance with at least one embodiment of the present invention. As depicted by FIG. 4B, Data Partition 450 starts at beginning of partition (BOP) 452 and ends at end of partition (EOP) 454 Data Partition 450 includes PEWZ 456 and buffer 458. Upon the tape head reaching the beginning of PEWZ 460 during a file operation, a programmable early warning is generated. In an embodiment, upon the tape head reaching the end of PEWZ 462 during a file operation, an early warning (EW) is generated. As further depicted by FIG. 4B, the point on the tape at which the tape transitions to a DATA_FULL state corresponds to the tape head reaching the end of PEWZ 462.

Figure 5:
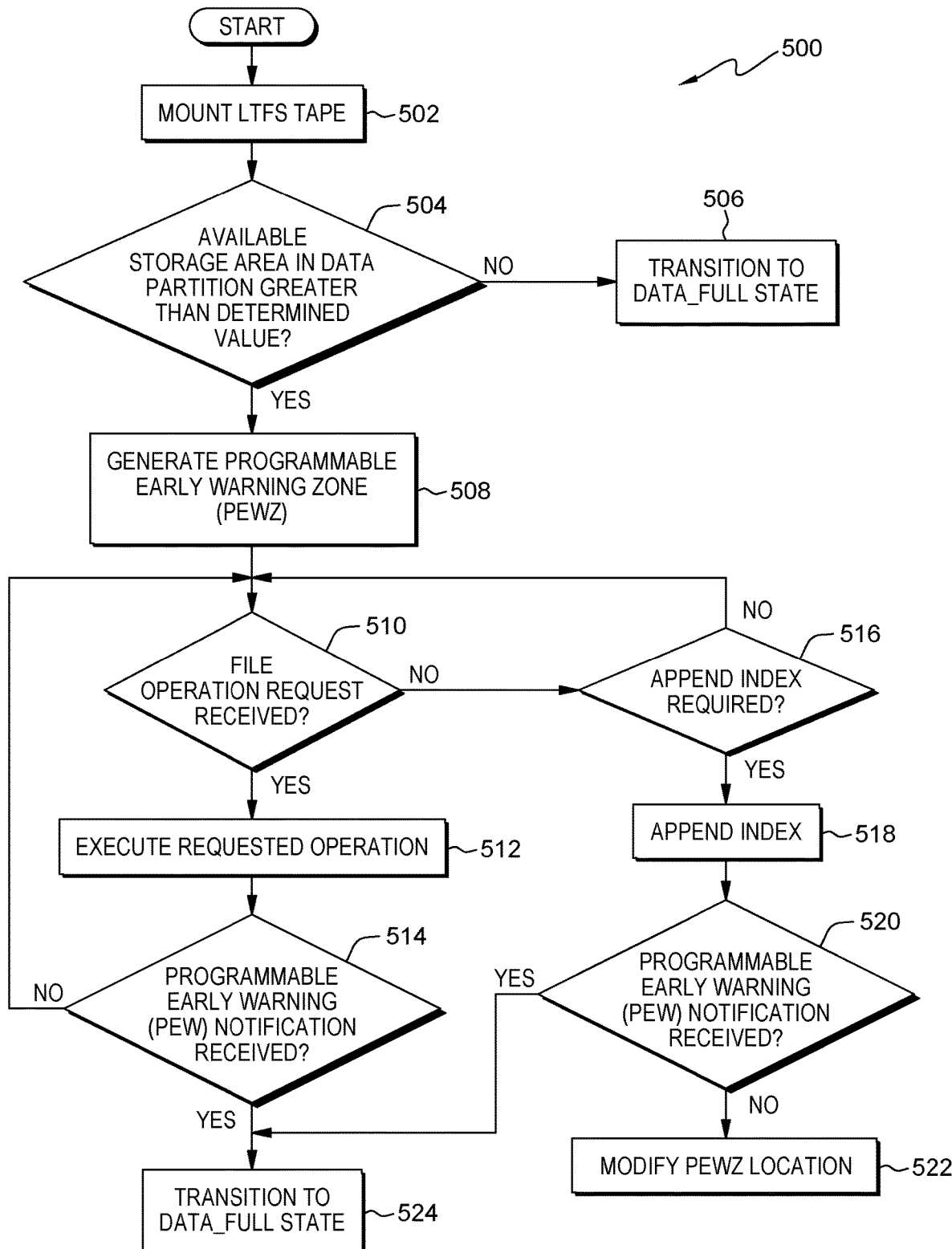
FIG. 5 is a flow chart diagram, generally designated 500, depicting operational steps for altering a position on a tape at which the tape transitions to a DATA_FULL state in accordance with at least one embodiment of the present invention.

FIG. 5 is a flow chart diagram, generally designated 500, depicting operational steps for modifying a buffer at the end of the last Data Band of a Data Partition on an LTFS formatted LTO tape cartridge in accordance with at least one embodiment of the present invention. FIG. 5 provides only an illustration of one implementation and does not imply any limitations with regard to the environments in which different embodiments may be implemented. Many modifications to the depicted environment may be made by those skilled in the art without departing from the scope of the invention as recited by the claims. It should be noted that although the following flow chart diagram is illustrative of an LTO tape cartridge, one of ordinary skill in the art will appreciate that various embodiments of the present invention may be practiced with any type of LTFS formatted tape storage device.

At step 502, buffer program 101 mounts a LTFS formatted LTO tape.

At step 504, buffer program 101 determines whether an available storage area in the Data Partition of the tape is greater than a predetermined value (e.g., 200 MB). If buffer program 101 determines that the available storage area in the Data Partition of the tape is less than the predetermined value (decision step 504 "NO" branch"), buffer program 101 proceeds to step 506. If buffer program 101 determines that the available storage area in the Data Partition of the tape is greater than the predetermined value (decision step 504 "YES" branch"), buffer program 101 proceeds to step 508.

At step 506, buffer program 101 transitions to a DATA_FULL state, in which only metadata write operations are permitted in the Data Partition. For example, buffer program 101 instructs the tape head of a tape drive to only perform metadata write operations, such as writing an Index to the Data Partition. In another example, if the tape head of a tape drive is actively writing file data to the Data Partition when a DATA_FULL state is issued, the tape drive automatically terminates writing any further file data to the Data Partition and begins appending an Index to the end of the most recent file data written to the Data Partition.

At step 508, buffer program 101 generates a programmable early warning zone (PEWZ). In an embodiment, a size of the PEWZ is based on the requirements of a particular user application. For example, a user application may request that the tape drive create a PEWZ having a size of 500 MB. In response to the request, buffer program 101 generates a 2-byte value that specifies how many MB (in this case, 500 MB) before the tape transitions to a DATA_FULL state.

At decision step 510, buffer program 101 determines whether a request for a file operation is received. In an embodiment, a file operation may include, but is not limited to, one or more of a Create Operation (to create a new file), Write Operation (to write data associated with a file), a Re-Position or Seek Operation (to move the file pointer's forward or backward), a Delete Operation (to delete data associated with a file), and a Truncate Operation (to delete the information stored inside a file without deleting the file itself).

At step 512, in response to determining that a request for a file operation is received, buffer program 101 executes the file operation. For example, buffer program 101 instructs a tape head of a tape drive to perform the file operation in the Data Partition of the tape.

At step 514, buffer program 101 determines whether a programmable early warning (PEW) is generated during performance of the file operation. In an alternative embodiment, buffer program 101 determines whether, during performance of the file operation, the tape head reaches the PEWZ.

If a PEW is not generated while writing file data to the Data Partition in accordance with the file operation (decision step 514 "NO" branch), buffer program 101 returns to decision step 510. In the alternative, if the tape head does not reach the PEWZ during performance of the file operation, buffer program 101 returns to step 510.

If a PEW is generated while writing file data to the Data Partition in accordance with the file operation (decision step 514 "YES" branch), buffer program 101 proceeds to step 524. In the alternative, upon detecting that the tape head reached the PEWZ during performance of the file operation, buffer program 101 returns proceeds to step 524.

At step 516, buffer program 101 determines whether an Index needs to be appended to the Data Partition of the tape. If an Index does not need to be appended to the Data Partition of the tape, buffer program 101 returns to decision step 510. If an Index needs to be appended to the Data Partition of the tape, buffer program 101 proceeds to step 518.

At step 518, buffer program 101 executes the operation to append the Index to the Data Partition. For example, buffer program 101 instructs a tape head of a tape drive to append an Index at the end of the file data on the Data Partition of the tape.

At decision step 520, buffer program 101 determines whether a PEW is generated while appending the Index to the Data Partition. In an alternative embodiment, buffer program 101 determines whether, during appending the Index to the Data Partition of the tape, the tape head reached the PEWZ.

If a PEW is not generated while appending the Index to the Data Partition, buffer program 101 proceeds to step 522. In the alternative, if the tape head does not reach the PEWZ while appending the Index to the Data Partition, buffer program 101 proceeds to step 522.

If a PEW is generated while appending the Index to the Data Partition, buffer program 101 proceeds to step 524. In the alternative, if the tape head does not reach the PEWZ while appending the Index to the Data Partition, buffer program 101 proceeds to step 524.

At step 522, buffer program 101 modifies the location of the PEWZ and the size of a buffer with respect to the end of the writeable area of the Data Partition. It should be noted that by moving the location of the PEWZ, the size of a buffer allocated for performing metadata operations only when a DATA_FULL state is reached is also altered. For example, a 1 GB buffer may be reserved at the end of the Data Partition for performing metadata operations only upon the tape drive transitioning to a DATA_FULL state. If a PEWZ having a size of 500 MB is created, the PEWZ would correspond to 500 MB of storage space immediately preceding the 1 GB of storage space reserved as a buffer. Accordingly, if the PEWZ having a size of 500 MB is moved 500 MB closer to the end of the writable area of the Data Partition, then the buffer reserved for performing metadata operations only when a DATA_FULL state is reached would ultimately be reduced from 1 GB to 500 MB.

In an embodiment, altering the location of the PEWZ on the tape is based on a size of a most recent Index appended to the Data Partition. For example, if the size of the most Index appended to the Data Partition is 200 MB, buffer program 101 moves the location of the PEWZ such that the size of the buffer equals the size of the most recent Index (200 MB) appended to the Data Partition. Accordingly, when the tape head reaches the end of the PEWZ, the tape drive will transition to a DATA_FULL state, in which 200 MB has been reserved for performing metadata write operations only. In another example, if the size of the most recent Index appended to the Data Partition is 300 MB, buffer program moves the location of the PEWZ such that the size of the buffer is twice the size (600 MB) of the most recent Index (300 MB) appended to the Data Partition. Accordingly, when the tape head reaches the end of the PEWZ, the tape drive will transition to a DATA_FULL state, in which 600 MB has been reserved for performing metadata write operations only.

At step 524, buffer program 101 transitions to a DATA_FULL state, in which only metadata write operations are permitted in the Data Partition. For example, buffer program 101 instructs the tape head of a tape drive to only perform metadata write operations, such as writing an Index to the Data Partition. In another example, if the tape head of a tape drive is actively writing file data to the Data Partition when a DATA_FULL state is issued, the tape drive automatically terminates writing any further file data to the Data Partition and begins appending an Index to the end of the most recent file data written to the Data Partition.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
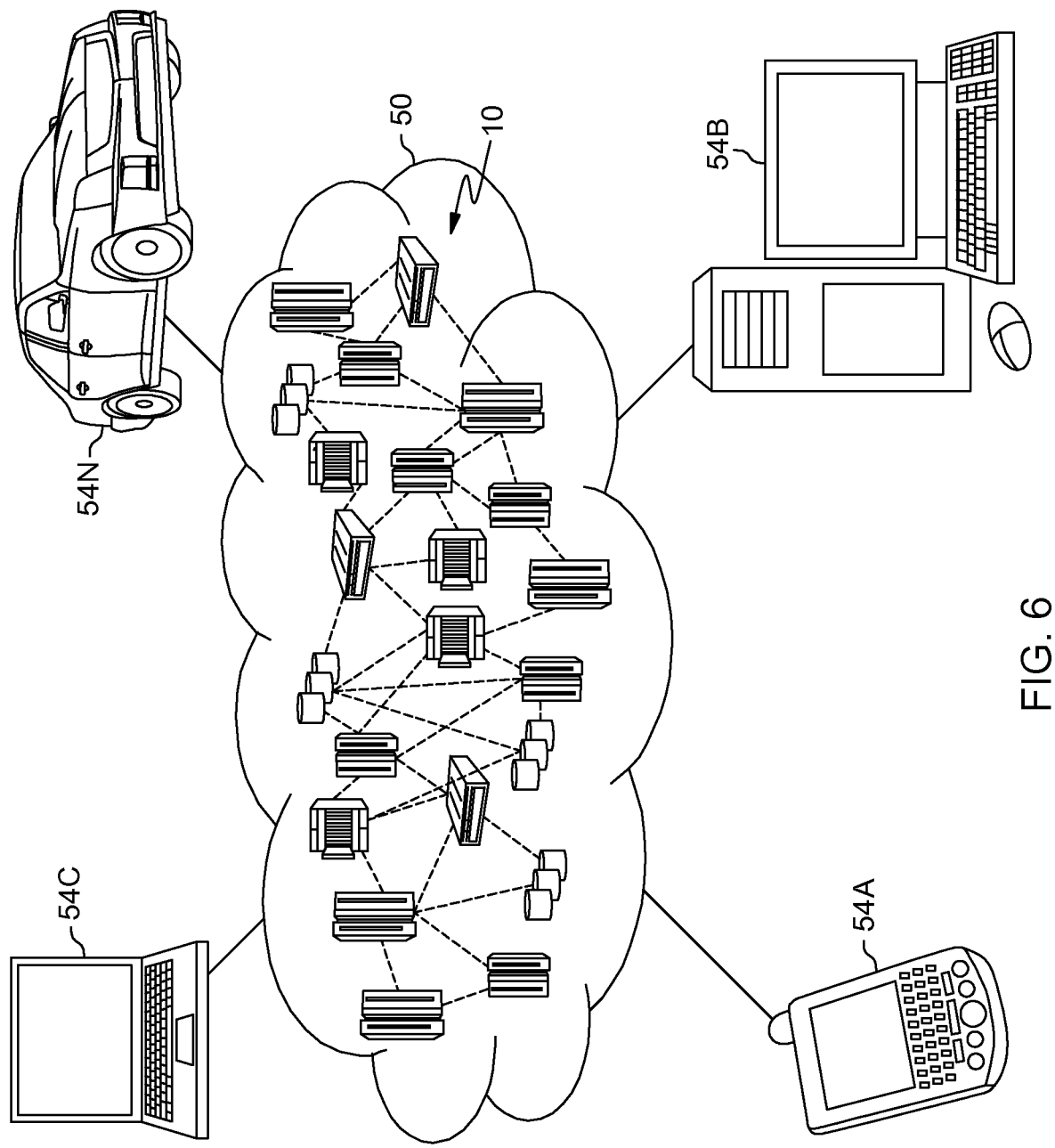
FIG. 6 is a block diagram depicting a cloud computing environment, generally designated 50, in accordance with at least one embodiment of the present invention.

FIG. 6 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
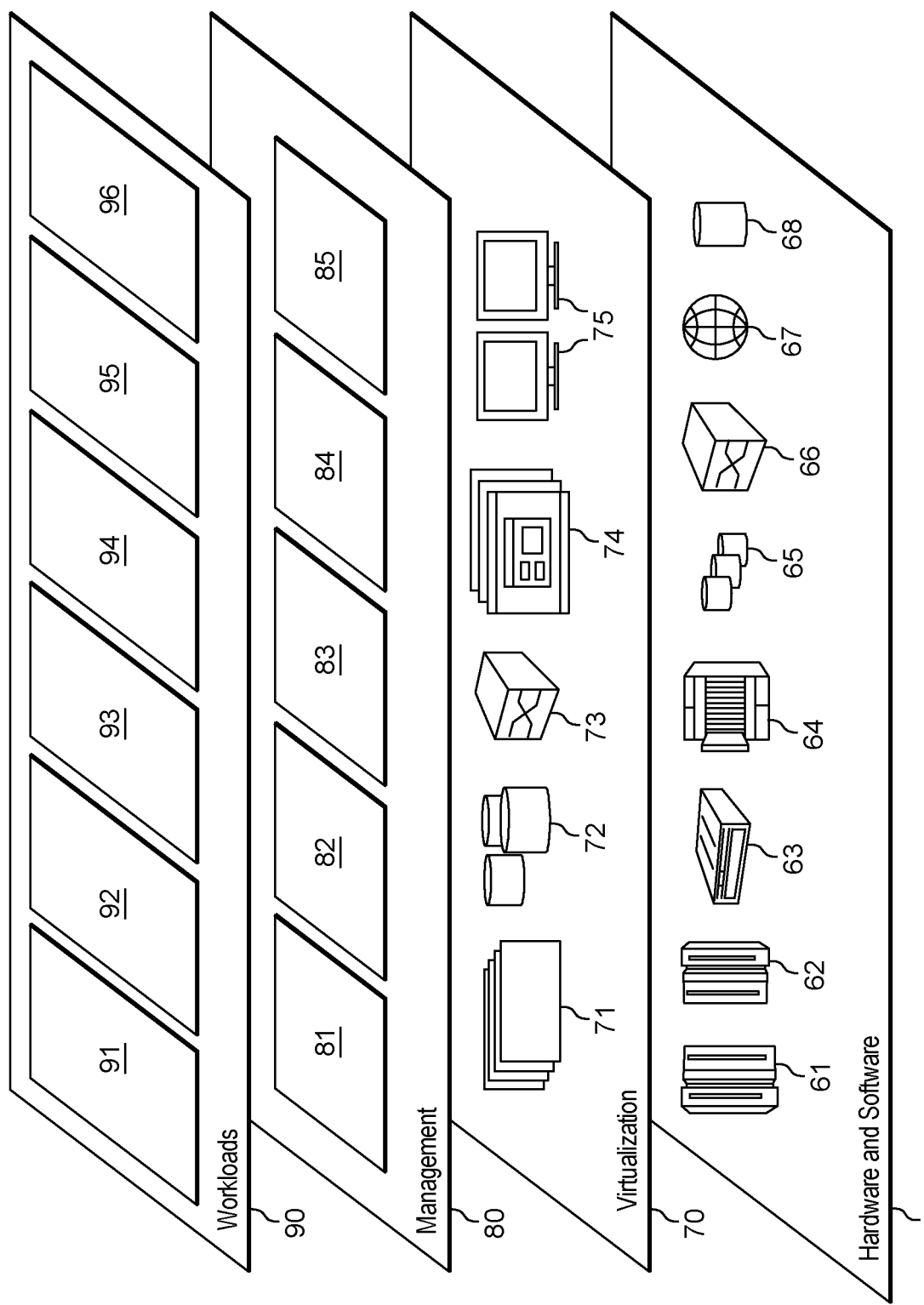
FIG. 7 is block diagram depicting abstraction model layers provided by cloud computing environment 50 of FIG. 6 in accordance with at least one embodiment of the present invention.

FIG. 7 is block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic migration of conversations between communication platforms 96.

Figure 8:
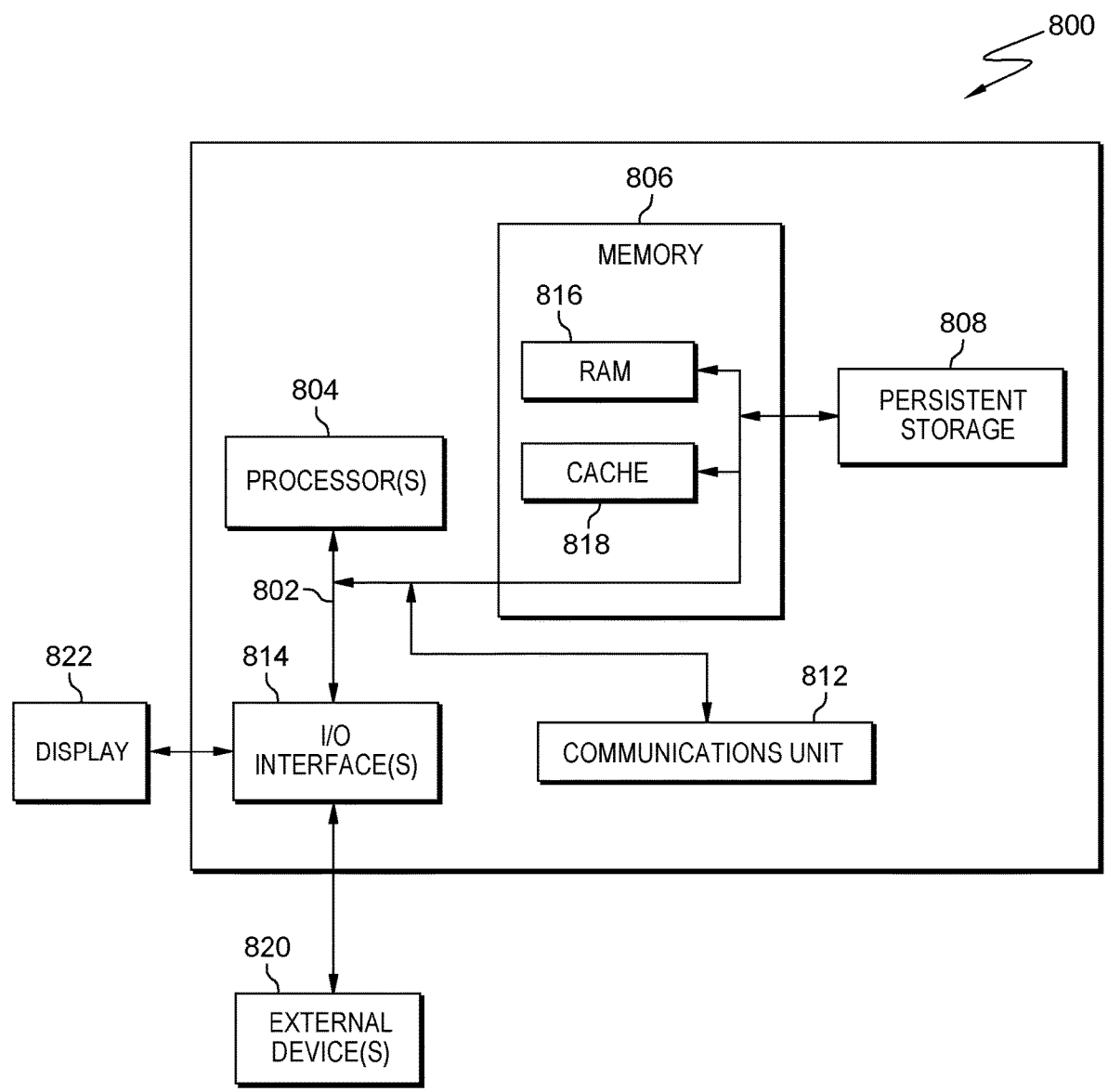
FIG. 8 is a block diagram depicting components of a computer, generally designated 800, suitable for executing buffer program 101 in accordance with at least one embodiment of the present invention.

FIG. 8 is a block diagram depicting components of a computing device, generally designated 800, suitable for executing buffer program 101. For example, computing device 800 may be representative of user device 110, tape library 120, and/or server 130 of FIG. 1. Computing device 800 includes one or more processor(s) 804 (including one or more computer processors), communications fabric 802, memory 806 including, RAM 816 and cache 818, persistent storage 808, communications unit 812, I/O interface(s) 814, display 822, and external device(s) 820. It should be appreciated that FIG. 8 provides only an illustration of one embodiment and does not imply any limitations with regard to the environments in which different embodiments may be implemented. Many modifications to the depicted environment may be made.

As depicted, computing device 800 operates over communications fabric 802, which provides communications between computer processor(s) 804, memory 806, persistent storage 808, communications unit 812, and input/output (I/O) interface(s) 814. Communications fabric 802 can be implemented with any architecture suitable for passing data or control information between processor(s) 804 (e.g., microprocessors, communications processors, and network processors), memory 806, external device(s) 820, and any other hardware components within a system. For example, communications fabric 802 can be implemented with one or more buses.

Memory 806 and persistent storage 808 are computer readable storage media. In the depicted embodiment, memory 806 includes random-access memory (RAM) 816 and cache 818. In general, memory 806 can include any suitable volatile or non-volatile one or more computer readable storage media.

Program instructions for buffer program 101 can be stored in persistent storage 808, or more generally, any computer readable storage media, for execution by one or more of the respective computer processor(s) 804 via one or more memories of memory 806. Persistent storage 808 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 812, in these examples, provides for communications with other data processing systems or devices. In these examples, communications unit 812 can include one or more network interface cards. Communications unit 812 may provide communications through the use of either or both physical and wireless communications links. In the context of some embodiments of the present invention, the source of the various input data may be physically remote to computing device 800 such that the input data may be received, and the output similarly transmitted via communications unit 812.

I/O interface(s) 814 allows for input and output of data with other devices that may operate in conjunction with computing device 800. For example, I/O interface(s) 814 may provide a connection to external device(s) 820, which may be as a keyboard, keypad, a touch screen, or other suitable input devices. External device(s) 820 can also include portable computer readable storage media, for example thumb drives, portable optical or magnetic disks, and memory cards. Software and data used to practice embodiments of the present invention can be stored on such portable computer readable storage media and may be loaded onto persistent storage 808 via I/O interface(s) 814. I/O interface(s) 814 also can similarly connect to display 822. Display 822 provides a mechanism to display data to a user and may be, for example, a computer monitor.

What is claimed is:

1. A computer-implemented method for altering a current position in a Data Partition of a tape at which the tape transitions to a DATA_FULL state, comprising:

determining a size of an Index to be appended to an end of file data written to the Data Partition of the tape; and altering, based on the size of the Index to be appended to the end of the file data written to the Data Partition of the tape, the current position in the Data Partition of the tape at which the tape transitions to the DATA_FULL state to a new position in the Data Partition of the tape at which the tape transitions to the DATA_FULL State, wherein the DATA_FULL state is a state on the tape in which only metadata write operations are permitted in the Data Partition.

2. The computer-implemented method of claim 1, wherein the DATA_FULL state occurs in response to a tape head reaching an end of a programmable early warning zone (PEWZ) in the Data Partition of the tape during a file operation.

3. The computer-implemented method of claim 1, wherein altering the current position in the Data Partition of the tape at which the tape transitions to the DATA_FULL state to the new position in the Data Partition of the tape at which the tape transitions to the DATA_FULL state further includes altering a position of a programmable early warning zone (PEWZ) in the Data Partition of the tape.

4. The computer-implemented method of claim 3, wherein altering the current position in the Data Partition of the tape at which the tape transitions to the DATA_FULL state to the new position in the Data Partition of the tape at which the tape transitions to the DATA_FULL state further includes altering a size of a buffer positioned subsequent to the PEWZ in the Data Partition of the tape, wherein only metadata write operations are permitted in the buffer.

5. The computer-implemented method of 1, wherein the current position in the Data Partition of the tape at which the tape transitions to the DATA_FULL state is moved towards an end of a writable area of the Data Partition of the tape if the size of the Index to be appended to the end of the file data written to the Data Partition of the tape is less than a storage area of a buffer located between the current position in the Data Partition of the tape at which the tape transitions to the DATA_FULL state and the end of the writable area of the Data Partition of the tape.

6. The computer-implemented method of claim 1, wherein the current position in the Data Partition of the tape at which the tape transitions to the DATA_FULL state is moved away from an end of a writeable area of the Data Partition of the tape if the size of the Index to be appended to the end of the file data written to the Data Partition of the tape is greater than a storage area of a buffer located between the current position on the tape at which the tape transitions to the DATA_FULL state and the end of the writable area of the Data Partition of the tape.

7. A computer program product for altering a current position in a Data Partition of a tape at which the tape transitions to a DATA_FULL state, the computer program product comprising one or more computer readable storage media and program instructions stored on the one or more computer readable storage media, the program instructions including instructions to:

determine a size of an Index to be appended to an end of file data written to the Data Partition of the tape; and alter, based on the size of the Index to be appended to the end of the file data written to the Data Partition of the tape, the current position in the Data Partition of the tape at which the tape transitions to the DATA_FULL state to a new position in the Data Partition of the tape at which the tape transitions to the DATA_FULL state, wherein the DATA_FULL state is a state on the tape in which only metadata write operations are permitted in the Data Partition.

8. The computer program product of claim 7, wherein the DATA_FULL state occurs in response to a tape head reaching an end of a programmable early warning zone (PEWZ) in the Data Partition of the tape during a write operation.

9. The computer program product of claim 7, wherein the instructions to alter the current position in the Data Partition of the tape at which the tape transitions to the DATA_FULL state to the new position in the Data Partition of the tape at which the tape transitions to the DATA_FULL state further include instructions to alter a position of a programmable early warning zone (PEWZ) in the Data Partition of the tape.

10. The computer program product of claim 9, wherein the instructions to alter the current position of the Data the tape at which the tape transitions to the DATA_FULL state to the new position in the Data Partition of the tape at which the tape transitions to the DATA_FULL state further include instructions to alter a size of a buffer positioned subsequent to the PEWZ in the Data Partition of the tape, wherein only metadata write operations are permitted in the buffer.

11. The computer program product of claim 7, wherein the current position on the tape at which the tape transitions to the DATA_FULL state is moved towards an end of a writable area of the Data Partition of the tape if the size of the Index to be appended to the end of the file data written to the Data Partition of the tape is less than a storage area of a buffer located between the current position on the tape at which the tape transitions to the DATA_FULL state and the end of the writable area of the Data Partition of the tape.

12. The computer program product of claim 7, wherein the current position of the tape at which the tape transitions to the DATA_FULL state is moved away from an end of a writeable area of the Data Partition of the tape if the size of the Index to be appended to the end of the file data written to the Data Partition of the tape is greater than a storage area of a buffer located between the current position on the tape at which the tape transitions to the DATA_FULL state and the end of the writable area of the Data Partition of the tape.

13. A computer system for altering a current position in a Data Partition of a tape at which the tape transitions to a DATA_FULL state, the computer system comprising:
one or more computer processors;
one or more computer readable storage media; and
computer program instructions, the computer program instructions being stored on the one or more computer readable storage media for execution by the one or more computer processors, and the computer program instructions including instructions to:
determine a size of an Index to be appended to an end of file data written to the Data Partition of the tape; and
alter, based on the size of the Index to be appended to the end of the file data written to the Data Partition of the tape, the current position in the Data Partition of the tape at which the tape transitions to the DATA_FULL state to a new position in the Data Partition of the tape at which the tape transitions to the DATA_FULL state, wherein the DATA_FULL state is a state on the tape in which only metadata write operations are permitted in the Data Partition.

14. The computer system of claim 13, wherein the DATA_FULL state occurs in response to a tape head reaching an end of a programmable early warning zone (PEWZ) in the Data Partition of the tape during a write operation.

15. The computer system of claim 13, wherein the instructions to alter the current position in the Data Partition of the tape at which the tape transitions to the DATA_FULL state to the new position in the Data Partition of the tape at which the tape transitions to the DATA_FULL state further include instructions to alter a position of a programmable early warning zone (PEWZ) in the Data Partition of the tape.

16. The computer system of claim 13, wherein the current position in the Data Partition of the tape at which the tape transitions to the DATA_FULL state is moved towards an end of a writable area of the Data Partition of the tape if the size of the Index to be appended to the end of the file data written to the Data Partition of the tape is less than a storage area of a buffer located between a current position on the tape at which the tape transitions to the DATA_FULL state and the end of the writable area of the Data Partition of the tape.

17. The computer system of claim 13, wherein the current position in the Data Partition of the tape at which the tape transitions to the DATA_FULL state is moved away from an end of a writeable area of the Data Partition of the tape if the size of the Index to be appended to the end of the file data written to the Data Partition of the tape is greater than a storage area of a buffer located between a current position on the tape at which the tape transitions to the DATA_FULL state and the end of the writable area of the Data Partition of the tape.

* * * * *